(12) United States Patent
Woo

(10) Patent No.: US 7,163,218 B2
(45) Date of Patent: Jan. 16, 2007

(54) SUSPENSION STRUCTURE OF FRONT AND REAR WHEELS IN AUTOMOBILE

(75) Inventor: Seung-Hoon Woo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 423 days.

(21) Appl. No.: 10/750,671

(22) Filed: Dec. 31, 2003

(65) Prior Publication Data

US 2005/0087945 A1 Apr. 28, 2005

(30) Foreign Application Priority Data

Oct. 23, 2003 (KR) ...................... 10-2003-0074217

(51) Int. Cl.
*B60G 21/05* (2006.01)
(52) U.S. Cl. ............................................. 280/124.106
(58) Field of Classification Search ......... 280/124.106, 280/124.107, 124.03, 124.04, 124.135, 124.138, 280/124.139
See application file for complete search history.

(56) References Cited

U.S. PATENT DOCUMENTS 3,166,340 A * 1/1965 Rusconi ...................... 280/104
3,598,385 A * 8/1971 Parsons Jr. .................... 267/30
4,313,619 A * 2/1982 Hailer ................. 280/124.138
2002/0113399 A1 8/2002 Fehler et al.

FOREIGN PATENT DOCUMENTS

| DE | 1 085 772 | | 7/1960 |
| DE | 1 183 805 | | 12/1964 |
| FR | 1 312 315 | | 1/1962 |
| JP | 03193513 A | * | 8/1991 |
| JP | 2000-012054 | | 1/2000 |

* cited by examiner

*Primary Examiner*—Faye M. Fleming
(74) *Attorney, Agent, or Firm*—Morgan Lewis & Bockius LLP

(57) ABSTRACT

A suspension structure for the front and rear wheels of an automobile, wherein the suspension structure of the front and rear wheels respectively is mounted with a first member traversably supporting an upper portion of a knuckle and a second member traversably supporting a lower portion of a knuckle, and the ratio of the length of the first member mounted at the front wheel relative to the length of the second member is designed to be shorter than the ratio of the length of the first member relative to the length of the second member, such that the automobile is tilted forward when the automobile rolls, thereby improving the rolling and turning/maneuvering stability of the automobile.

4 Claims, 2 Drawing Sheets

— FRONT WHEEL    --- REAR WHEEL

SUSPENSION STRUCTURE OF FRONT AND REAR WHEELS IN AUTOMOBILE

CROSS-REFERENCE TO RELATED APPLICATIONS

This application claims priority to Korean Patent Application No. 10-2003-0074217, filed on Oct. 23, 2003, which is incorporated fully herein by reference.

FIELD OF THE INVENTION

The present invention relates to a suspension structure for the front and rear wheels of an automobile and, more particularly, to a suspension structure for the front and rear wheels of an automobile adapted to control the position change of the roll center when the automobile turns, thus stabilizing the maneuverability of the automobile.

BACKGROUND OF THE INVENTION

Generally, an automobile body tilts about the roll center when the automobile turns. A tilted angle is referred to as a roll angle, in which the roll angle becomes larger whenever the roll center is low and the automobile drives at a high speed.

The roll center of a front wheel is positioned close to the ground surface while the roll center of a rear wheel is positioned higher than that of the front wheel. A line connecting a roll center of a front wheel and that of a rear wheel is called a roll axis, and an automobile is tilted about the roll center when the automobile turns.

Although the roll center plays an important role in terms of the maneuvering stability when an automobile turns, no accurate explanation has been given so far about the factors that have an influence on the position change of the roll center when an automobile turns. It is difficult to control the position change of the roll center, so the maneuvering stability of an automobile therefore has not been greatly improved.

SUMMARY OF THE INVENTION

The present invention provides a suspension structure for the front and rear wheels of an automobile configured to closely incorporate factors that have an effect on the position change of the roll center when the automobile turns, whereby the position change of the roll center is controlled when the automobile turns and thus improving the maneuvering stability of the automobile.

In accordance with a preferred embodiment of the present invention, the suspension structure for the front and rear wheels of an automobile is respectively mounted at the front and rear wheels with a first member traversably supporting an upper portion of a knuckle and a second member traversably supporting a lower portion of the knuckle. In this suspension structure, the ratio of the length of the second member relative to the length of the first member mounted at the front wheel is smaller than the ratio of the length of the second member relative to the length of the first member mounted at the rear wheel.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENT

The preferred embodiment of the present invention will now be described in detail with reference to the annexed drawings, where the present embodiment is not limiting the scope of the present invention but is given only as an illustrative purpose.

Figure 1:
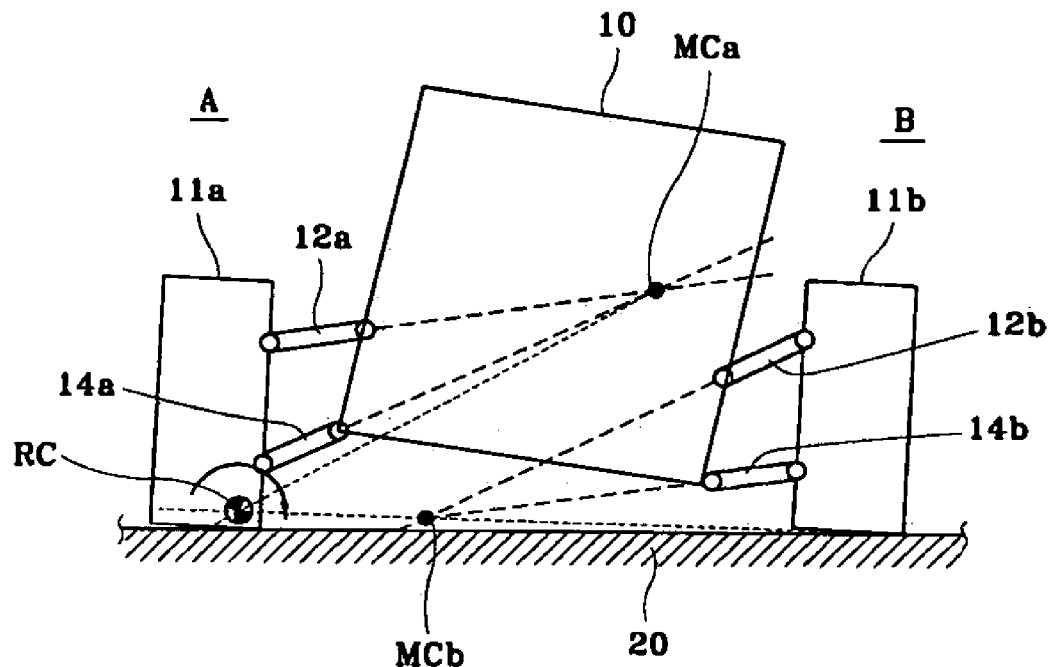
FIGS. 1 and 2 are schematic drawings for illustrating a suspension structure of front and rear wheels in an automobile according to an embodiment of the present invention.
Figure 2:
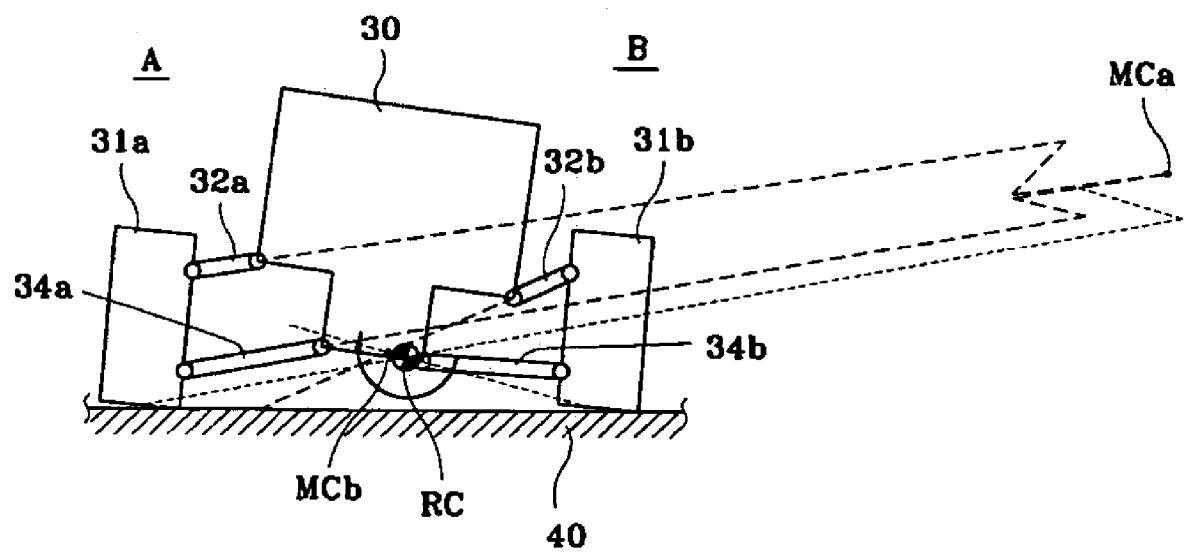

Upper arms 12a and 12b of a suspension structure, as illustrated in FIG. 1, is longer than upper arms 32a and 32b of a suspension structure illustrated in FIG. 2. These figures depict the change of a roll center in accordance with upper arms being lengthened in a double wishbone type suspension structure.

When an automobile with the suspension structure as described above turns, a moment center (MCb) during a bump (B) drops, while a moment center (MCa) during a rebound (A) rises. Roll centers formed by these moment centers tend to move to the inside of a turning automobile (left on the drawing) as the upper arms 12a and 12b are lengthened.

When a roll moment is applied to a roll center (RC) tilted to the inside of a turning automobile, the force applied to an automobile body 10 heads downward, and the automobile tends to move downward as the automobile is rolled.

Because the height of the roll center (RC) is decreased, the jack-up effect is either decreased or generated, whereby the automobile body 10 hardly goes up but tends to move downward.

This phenomenon is even more outstanding in a MacPherson strut type suspension as shown in FIG. 1. In a MacPherson strut suspension, the upper end of the strut (not shown) is attached to an automobile body while the lower end is supported by the lower arm (not shown). In this type of structure, a strut functions as an upper arm, and the upper arm connected at the upper end thereof to an automobile body has a very long length in relation to the lower arm. Therefore, the phenomenon shown in FIG. 1 appears in the MacPherson strut type suspension.

Upper arms 32a and 32b illustrated in FIG. 2 are shorter than the upper arms 12a and 12b of FIG. 1. When an automobile having this type of suspension turns, the moment center (MCb), where extension lines from the upper arm 32b at the bump side (B) and the lower arm 34b meet, is positioned at a point closer to the upper arm 32b and the lower arm 34b as the length of the upper arm gets shortened, so that the moment center (MCb) moves more to the right on the drawing (external side of turning).

The moment center (MCa), where extension lines from the upper arm 32a at the rebound side (A) and the lower arm 34a meet, is positioned at a point. The point is at the external side of the turning and distanced far away from the upper arm 32a and the lower arm 34a, such that the roll center (RC) formed by the moment centers tends to move outside of the turning as the lengths of the upper arms 32a, 32b become shortened.

When the roll moments are applied to the roll centers that moved outside of the turning as described above, the force applied to the automobile body 30 heads upward to prompt the automobile body 30 to go upward as the automobile rolls.

In addition, the height of the roll center is also enhanced to increase the jack-up effect, and the automobile body 30 tends to go further upward.

Meanwhile, it is known that an automobile whose body tends to pitch toward the front thereof has a better roll feeling when it turns and has a better turning stability. As a result, it is preferable to design a front and rear wheel suspension structure where the front side of the automobile body is lower than the rear side of the automobile body when the automobile turns.

In a front and rear wheel suspension structure according to the preferred embodiments of the present invention, the front wheel suspension structure is embodied as shown in FIG. 1, and the rear wheel suspension structure is embodied as shown in FIG. 2. In this regard, the automobile is tilted toward the front when the automobile rolls, thus improving the rolling and increasing the turning/maneuvering stability.

The structure will be described in detail through the following embodiments.

In a first embodiment, the suspension structure is such that a first member traversably supports an upper portion of a knuckle and a second member traversably supports a lower portion of the knuckle, and the members are definitely divided and separated.

For example, a wishbone type suspension structure comprising an upper arm of a first member and a lower arm of a second member is described. In this structure, the front and rear wheel suspension structure is designed according to the following Formula 1.

FORMULA 1

(Length of front wheel lower arm/length of front wheel upper arm<length of rear wheel lower arm/length of rear wheel upper arm)

As evidenced in Formula 1, the suspension structure is designed so that the ratio of the length of the front wheel lower arm relative to the length of the front wheel upper arm is smaller than the ratio of the length of the rear wheel lower arm relative to the length of the rear wheel upper arm, whereby the front of the automobile body descends lower than the rear of the automobile body when the automobile rolls.

In the second embodiment, the upper arm and lower arm are not definitely divided and separated as in the wishbone type suspension structure. Instead, a, suspension structure can be substituted with a double wishbone type suspension structure, which is presented in this second embodiment.

In other words, a member traversably supporting an upper portion of a knuckle, although the member is not designated as an upper arm but corresponds thereto, and a member traversably supporting a lower portion of a knuckle, although the member is not designated as a lower arm but corresponds thereto, are applied in the suspension structure of the second embodiment. In this structure, the front and rear wheel suspension structure can be designed according to the following Formula 2.

FORMULA 2

(Length of member corresponding to front wheel lower arm/length of member corresponding to front wheel upper arm<length of member corresponding to rear wheel lower arm/length of member corresponding to rear wheel upper arm)

As explained in Formula 2, the suspension is designed according to a structure having a ratio of the length of the member corresponding to the front wheel lower arm relative to the length of the member corresponding to the front wheel upper arm that is smaller than the ratio of the length of the member corresponding to the rear wheel lower arm relative to the length of the member corresponding to the rear wheel upper arm, whereby the front of the automobile body descends lower than the rear of the automobile body when an automobile rolls.

In the third embodiment of the present invention, a strut (a member corresponding to an upper arm as in the MacPherson strut type suspension) is applied to the suspension structure.

In this case, the length of the upper arm is almost indefinitely long when compared to that of all the front and rear lower arms, such that the suspension structure can be designed as in the following Formula 3.

FORMULA 3

(Length of member corresponding to front wheel lower arm<length of member corresponding to rear wheel lower arm)

As seen in Formula 3, when the upper arm of the front and rear wheel suspension is provided with the strut, the length of the upper arm is indefinitely long such that the suspension structure is determined by the lower arm.

In other words, a factor in determining the suspension structure is the lower arm, where the suspension structure is such that the length of the member corresponding to the rear wheel lower arm is designed to be longer than the length of the member corresponding to the front wheel lower arm. In this regard, the front of the automobile body descends lower than the rear of the automobile when the automobile rolls.

In the fourth embodiment, a suspension structure, where the member corresponding to a lower arm is provided with a strut as in the MacPherson strut type suspension, is applied. In this case, the length of the lower arm is almost indefinitely long when compared to all front and rear upper arms, and can be designed as per the following Formula 4.

FORMULA 4

(Length of member corresponding to front wheel upper arm>length of member corresponding to rear wheel upper arm)

As explained in Formula 4, when the lower arm of the front and rear suspension is constructed with a strut, the lower arm is almost indefinitely long, such that the suspension structure is determined by the upper arm.

In other words, a factor in determining the suspension structure is the upper arm, where the suspension structure should be made with a suspension having a length in which the member corresponding to the rear wheel upper arm is shorter than the length of the member corresponding to a front wheel upper arm. In this regard, the front of the automobile body descends lower than the rear of the automobile when the automobile rolls.

Figure 3:
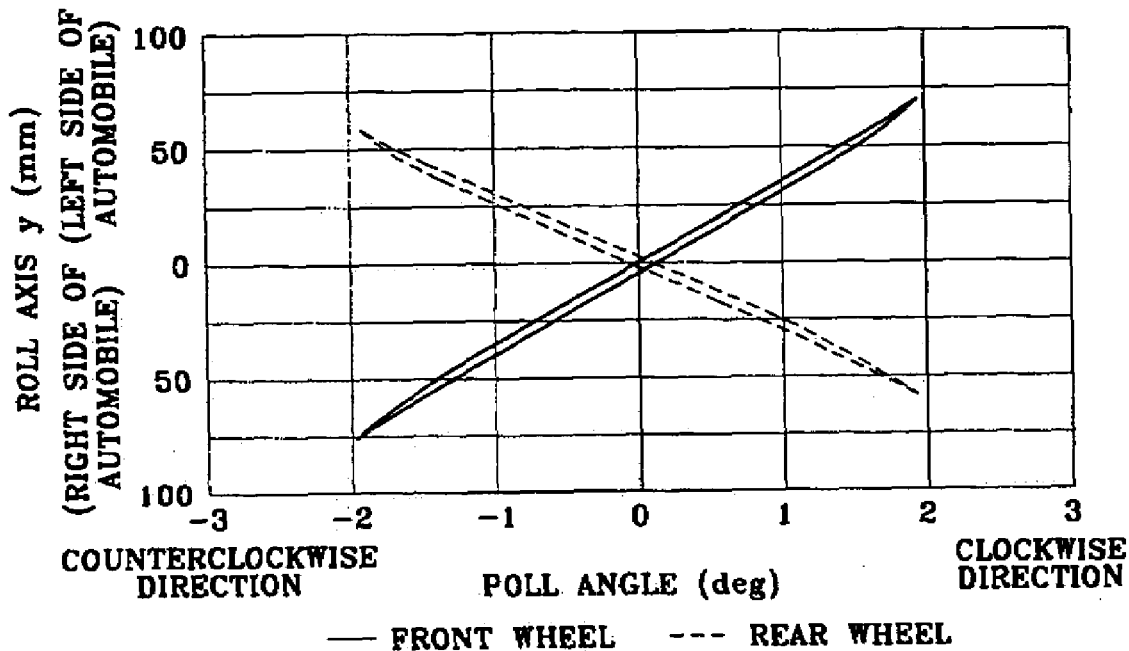
FIG. 3 is a graph for illustrating the movement of the roll center of an automobile applied with a suspension structure of front and rear wheels when the automobile turns according to an embodiment of the present invention.

FIG. 3 illustrates the movement of the roll center of the automobile when applied with an embodiment of the present invention.

As evidenced in the drawing, when an automobile, as seen and observed from the front of the automobile, turns to the right, the automobile body rolls in a counterclockwise direction. The roll center of the front wheel suspension moves to the right side (inside of the turning) as the automobile body rolls, and the roll center of the rear wheel suspension moves to the left (external side of the turning) as the automobile body rolls.

Likewise, when the automobile in FIG. 3 turns to the left, the automobile body rolls in a clockwise direction, and the roll center of the rear wheel suspension moves to the left of the automobile (inside of turning) as the automobile body rolls. The roll center of the rear wheel suspension moves to the right of the automobile (external side of the turning) as the automobile body rolls.

Figure 4:
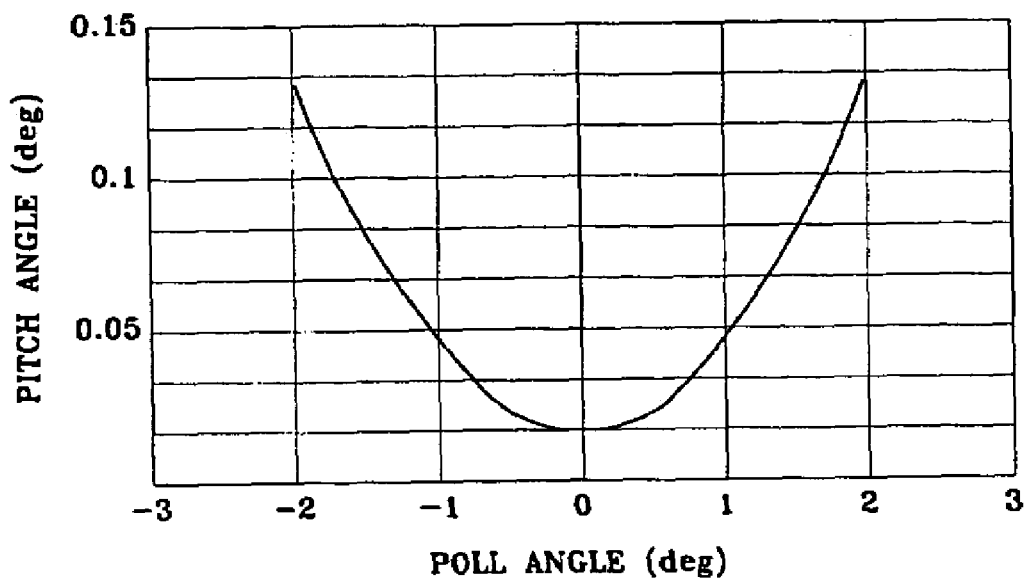
FIG. 4 is a graph for illustrating a pitch movement of an automobile applied with a suspension structure of front and rear wheels according to an embodiment of the present invention.

FIG. 4 is a schematic drawing for illustrating a pitch movement when the automobile rolls.

When an automobile rolls to the left, the roll angle changes from zero to a negative or positive value, and as a result, regardless of the changing roll angle increasing to a negative or positive value, the pitch angle tends to increase. In other words, it can be noted that the automobile body tends to tilt forward when it rolls.

As apparent from the foregoing, there is an advantage in the suspension structure of front and rear wheels in an automobile as described according to the embodiments of the present invention in that the suspension structure of front and rear wheels respectively is mounted with a first member traversably supporting an upper portion of a knuckle and a second member traversably supporting a lower portion of a knuckle, and the ratio of the length of the first member mounted at the front wheel relative to the length of the second member is designed to be shorter than the ratio of the length of the first member relative to a length of the second member, such that an automobile is tilted forward when the automobile rolls, thereby improving the rolling and turning/maneuvering stability of the automobile.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. A suspension structure for the front and rear wheels of an automobile, wherein the structure is respectively mounted at front and rear wheels with a first member traversably supporting an upper portion of a knuckle and a second member traversably supporting a lower portion of said knuckle, and a ratio of the length of said second member relative to the length of said first member mounted at said front wheel is smaller than a ratio of the length of said second member relative to the length of said first member mounted at said rear wheel.

2. The structure as defined in claim 1, wherein, in case said first members respectively mounted at said front and rear wheels are provided with struts, the length of said second member mounted at said front wheel is formed to be shorter than the length of said second member mounted at said rear wheel.

3. The structure as defined in claim 1, wherein, in case said second members respectively mounted at said front and rear wheels are provided with struts, the length of said first member mounted at said front wheel is formed to be longer than the length of said first member mounted at said rear wheel.

4. The structure as defined in claim 1, wherein said first member is an upper arm while said second member is a lower arm.

* * * * *